United States Patent
Yuyama et al.

(10) Patent No.: US 7,436,439 B2
(45) Date of Patent: Oct. 14, 2008

(54) IMAGE PICKUP APPARATUS, GAIN CONTROL METHOD, AND GAIN CONTROL PROGRAM, WHICH SEQUENTIALLY SET GAIN VALUES IN A GAIN ADJUSTING CIRCUIT TO SELECT A GAIN VALUE TO BE SET IN ANOTHER GAIN ADJUSTING CIRCUIT TO MAINTAIN WHITE BALANCE

(75) Inventors: Masami Yuyama, Ome (JP); Noriyasu Murata, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 1217 days.

(21) Appl. No.: 10/461,772

(22) Filed: Jun. 13, 2003

(65) Prior Publication Data

US 2003/0231248 A1 Dec. 18, 2003

(30) Foreign Application Priority Data

Jun. 14, 2002 (JP) ............................. 2002-173873

(51) Int. Cl.
*H04N 9/73* (2006.01)
(52) U.S. Cl. ................................................ 348/223.1
(58) Field of Classification Search ............. 348/222.1, 348/223.1, 224.1, 225.1, 655
See application file for complete search history.

(56) References Cited

U.S. PATENT DOCUMENTS

| | | | |
|---|---|---|---|
| 4,584,598 A | 4/1986 | Kutaragi | |
| 4,679,066 A | 7/1987 | Masunaga et al. | |
| 4,899,212 A | 2/1990 | Kaneko et al. | |
| 5,223,921 A | 6/1993 | Haruki et al. | |
| 5,617,139 A | 4/1997 | Okino | |
| 6,160,593 A * | 12/2000 | Nakakuki | 348/713 |
| 6,670,987 B1 | 12/2003 | Taura | |
| 6,982,753 B1 | 1/2006 | Udagawa | |
| 7,009,639 B1 | 3/2006 | Une et al. | |
| 7,098,945 B1 * | 8/2006 | Sasai et al. | 348/223.1 |
| 7,184,079 B2 * | 2/2007 | Hoshuyama | 348/223.1 |
| 7,184,080 B2 * | 2/2007 | Kehtarnavaz et al. | 348/223.1 |
| 2003/0030730 A1 | 2/2003 | Nakayama | |
| 2005/0047771 A1 | 3/2005 | Yuyama | |

FOREIGN PATENT DOCUMENTS

| | | |
|---|---|---|
| EP | 0 862 335 A2 | 9/1998 |
| EP | 1 045 594 A2 | 10/2000 |
| JP | 4-70179 A | 3/1992 |
| JP | 07-245764 A | 9/1995 |

(Continued)

*Primary Examiner*—Justin P Misleh
(74) *Attorney, Agent, or Firm*—Frishauf, Holtz, Goodman & Chick, P.C.

(57) ABSTRACT

A first gain value table stores gain values set in R and B amplifiers of a first gain adjusting circuit, and a second gain value table stores gain values set in R and B amplifiers of a second gain adjusting circuit. The gain values from the second gain value table are sequentially set in the second gain adjusting circuit to detect white portions. Based on the detection of the white portions, a gain value to be set in the first gain adjusting circuit is selected from the first gain value table, to obtain an image that maintains white balance.

11 Claims, 8 Drawing Sheets

FOREIGN PATENT DOCUMENTS

| | | |
|---|---|---|
| JP | 10-150671 A | 6/1998 |
| JP | 11-262029 A | 9/1999 |
| JP | 2000-299876 A | 10/2000 |
| JP | 2000-308069 A | 11/2000 |
| JP | 2001-359116 A | 12/2001 |
| JP | 2002-118857 A | 4/2002 |
| JP | 2003-61102 A | 2/2003 |

* cited by examiner

| LIGHT SOURCE | No. | R GAIN | B GAIN |
|---|---|---|---|
| SHADE A | 1 | 150 | 61 |
| SHADE B | 2 | 145 | 63 |
| SUNLIGHT A | 3 | 138 | 67 |
| SUNLIGHT B | 4 | 129 | 72 |
| SUNLIGHT C | 5 | 122 | 78 |
| FLUORESCENT LAMP A | 6 | 115 | 124 |
| FLUORESCENT LAMP B | 7 | 110 | 130 |
| FLUORESCENT LAMP C | 8 | 110 | 111 |
| TUNGSTEN LAMP | 9 | 91 | 130 |
| INCANDESCENT LAMP | 10 | 73 | 150 |
| GREEN | 11 | 150 | 160 |
| BEIGE | 12 | 122 | 100 |

IMAGE PICKUP APPARATUS, GAIN CONTROL METHOD, AND GAIN CONTROL PROGRAM, WHICH SEQUENTIALLY SET GAIN VALUES IN A GAIN ADJUSTING CIRCUIT TO SELECT A GAIN VALUE TO BE SET IN ANOTHER GAIN ADJUSTING CIRCUIT TO MAINTAIN WHITE BALANCE

CROSS-REFERENCE TO RELATED APPLICATIONS

This application is based upon and claims the benefit of priority from the prior Japanese Patent Application No. 2002-173873, filed Jun. 14, 2002, the entire contents of which are incorporated herein by reference.

BACKGROUND OF THE INVENTION

1. Field of the Invention

The present invention relates to an image pickup apparatus, a white balance control method, and a white balance control program.

2. Description of the Related Art

Electronic still cameras, which belong to image pickup apparatuses, are, in some cases, provided with an auto white balance function of automatically setting the white balance of an image to be picked up.

For auto white balance, it is necessary to determine which part of an image to be picked up is white. However, if a subject contains a color similar to white such as a light blue or a flesh color, then at the white determining stage, there is a possibility that such a color similar to white may be determined as real white. Accordingly, in such a situation, what is called a "drawing effect" may occur in which a white subject appears bluish, while a red subject appears light red. Consequently, a liquid crystal monitor may display through images with the drawing effects. Of course, if a shutter of the electronic camera is depressed in such a situation, a recorded image has an inappropriate white balance.

The term "through images" as used herein means images sequentially picked up by image pickup means and displayed on the monitor to allow a user to check the subject while the image pickup device is in an image pickup standby state.

BRIEF SUMMARY OF THE INVENTION

According to an aspect of the present invention, there is provided an image pickup apparatus comprising:

an image pickup device which picks up an image of a subject to output an image pickup signal;

first and second amplifying units configured to individually amplify color components of the image pickup signal outputted by the image pickup device;

a first storage unit configured to store plural types of gain values for the respective color components which are used to maintain a white balance of the subject;

a varying unit configured to sequentially vary the gain values for the respective color components from the second amplifying unit;

gain value detecting unit configured to detect a gain value having color information contained in a predetermined white detection range on the basis of image information generated using the image pickup signal amplified by the second amplifying unit using the gain values for the respective color components sequentially varied by the varying unit;

gain value selecting unit configured to select a gain value to be set in the first amplifying unit, from the first storage unit on the basis of the gain value detected by the detecting unit;

gain value setting unit configured to set the gain value selected by the selecting unit, in the first amplifying unit; and recording control unit configured to use the gain value set by the setting unit to cause the image information generated using the image pickup signal amplified by the first amplifying unit to be recorded in an image recording section.

According to another aspect of the present invention, there is provided a white balance control method in an image pickup apparatus comprising image pickup unit configured to pick up an image of a subject to output an image pickup signal, first and second amplifying unit configured to individually amplify color components of the image pickup signal outputted by the image pickup unit, and gain value storage unit configured to store plural types of gain values for the respective color components which are used to maintain a white balance of the subject, the method comprising:

sequentially varying the gain values for the respective color components from the second amplifying unit;

detecting a gain value having color information contained in a predetermined white detection range on the basis of image information generated using the image pickup signal amplified by the second amplifying unit using the gain values for the respective color components sequentially varied;

selecting a gain value to be set in the first amplifying unit, from the first storage unit on the basis of the gain value detected;

setting the gain value selected, in the first amplifying unit; and controlling the recording of the image information using the set gain value to cause the image information generated using the image pickup signal amplified by the first amplifying unit to be recorded in an image recording section.

According to further aspect of the present invention, there is provided an image pickup apparatus comprising:

an image pickup device which picks up an image of a subject to output an image pickup signal;

first and second amplifying units configured to individually amplify color components of the image pickup signal outputted by the image pickup device;

first storage unit configured to store plural types of gain values for the respective color components which are used to maintain a white balance of the subject;

varying unit configured to sequentially vary the gain values for the respective color components from the second amplifying unit;

gain value detecting unit configured to detect a gain value having color information contained in a predetermined white detection range on the basis of image information generated using the image pickup signal amplified by the second amplifying unit using the gain values for the respective color components sequentially varied by the varying unit;

gain value selecting unit configured to select a gain value to be set in the first amplifying unit, from the first storage unit on the basis of the gain value detected by the detecting unit;

gain value setting unit configured to set the gain value selected by the selecting unit, in the first amplifying unit; and display control unit configured to use the gain value set by the setting unit to cause an image display section to display the image information generated using the image pickup signal amplified by the first amplifying unit.

DETAILED DESCRIPTION OF THE INVENTION

Figure 1:
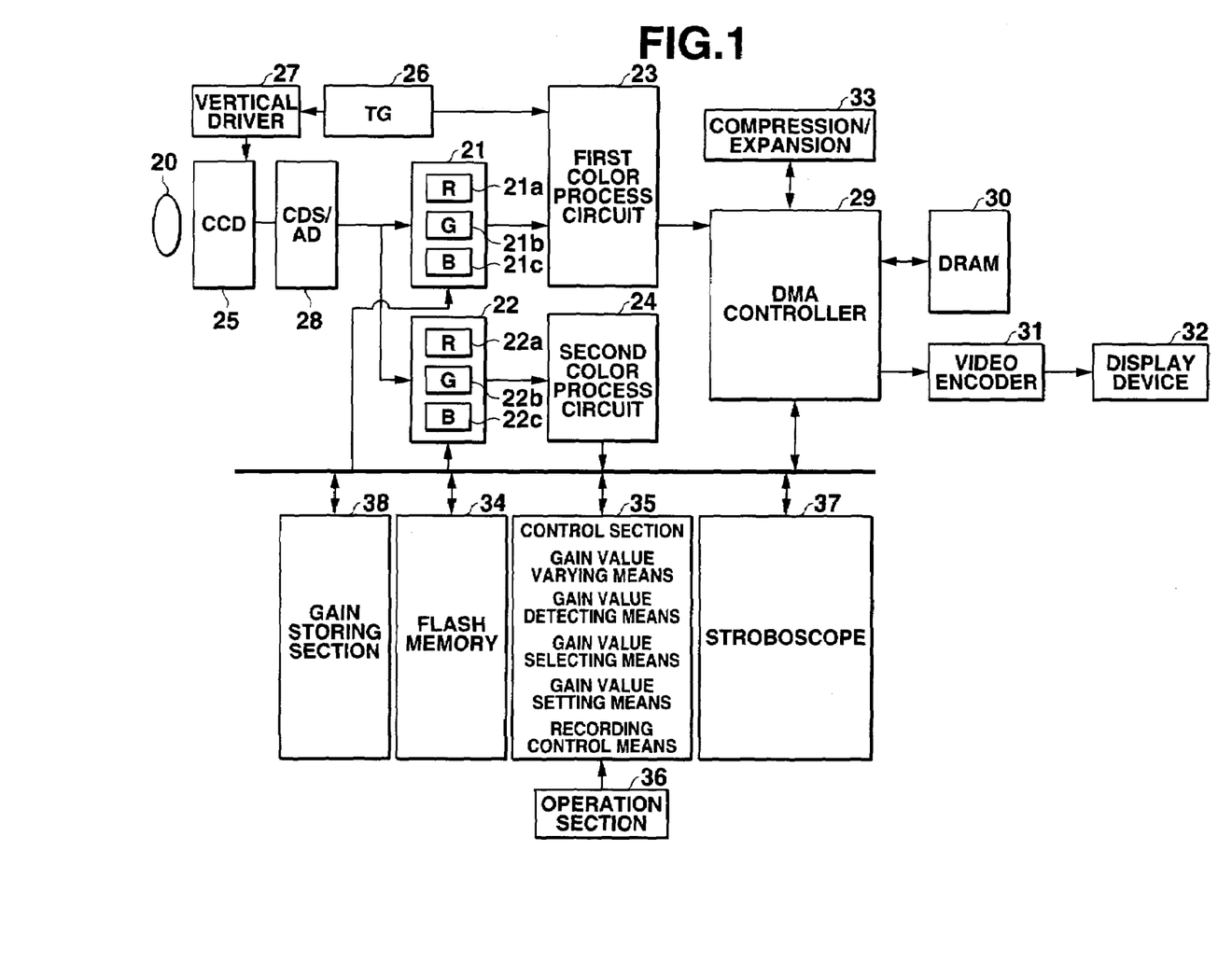
FIG. 1 is a block diagram showing a structure of an electronic still camera according to a first embodiment of the present invention.

A first embodiment of the present invention will be described below with reference to the drawings. FIG. 1 is a block diagram of an electronic still camera according to a first embodiment of the present invention.

A CCD 25 arranged behind an objective lens 20 is driven by a timing generator (TG) 26 through a vertical driver 27. The CCD 25 is provided with an array of color filters for primary colors R, G, and B. An optical image formed on a light receiving surface of the CCD 25 by the lens 20 is stored in light receiving sections R (Red), G (Green), and B (Blue) as charges and converted into R, G, and B signal charges the amounts of which are based on the intensity of the respective color light components. Then, the resulting analog image signal is outputted to a unit circuit 28. The unit circuit 28 is composed of a correlated double sampler (CDS) that removes noise included in the input image pickup signal and an A/D converter that converts the image pickup signal free from the noise into digital image data. The image data outputted by the unit circuit 28 is transmitted to a first gain adjusting circuit 21 (first amplifying unit) and a second gain adjusting circuit 22 (second amplifying unit).

The first and second gain adjusting circuits 21 and 22 comprise R amplifiers 21a and 22a for the R color component, G amplifiers 21b and 22b for the G color component, and B amplifiers 21c and 22c for the B color component. Gain value varying means of the control section 35 transmits control signals to control the gains of the amplifiers 21a, 22a, 21b, 22b, 21c, and 22c. An image signal amplified by the first gain adjusting circuit 21 is transmitted to a first color process circuit 23. The first color process circuit 23 executes color processing on the signal and then writes the processed signal in a buffer of a DMA (Direct Memory Access) controller 29 as YUV data containing a digital luminous signal (Y signal) and color difference signals (Cb signal and Cr signal). At the same time, the R, G, and B image data that has not undergone the color process is also written in the buffer. The DMA controller 29 transfers the YUV data written in the buffer to a designated area in a DRAM 30 for expansion.

A video encoder 31 generates a video signal on the basis of the YUV data read from the buffer and then outputs it to a display device 32 composed of an LCD (Liquid Crystal Display). Thus, when an REC through mode in an image pickup standby status is set, the picked up image of the subject is displayed on the display device 32 as a through image. Further, in this situation, when a shutter key is depressed to give an instruction on photographing, one frame of YUV data written in the buffer is transmitted to a compression/expansion section 33. The compression/expansion section 33 compresses the data and then records the compressed data in a flash memory 34. When a PLAY mode is set for image reproduction or the like, the image data recorded in the flash memory 34 is transmitted to the compression/expansion section 33 via the DMA controller 29. The compression/expansion section 33 performs the data expansion operation to reproduce YUV data. Thus, the recorded image is displayed on the display device 32.

On the other hand, an image signal amplified by the second gain adjusting circuit 22 is transmitted to a second color process circuit 24. The second color process circuit 24 executes a color process on the image signal and then transmits the processed signal to a control section 35 as YUV data containing a digital luminous signal (Y signal) and color difference signals (Cb signal and Cr signal).

The control section 35 has a central processing unit (CPU), a ROM in which programs and data are stored, and a work RAM. The control section 35 controls operations of the previously described sections in accordance with predetermined programs. It also responds to status signals transmitted by an operation section 36 to carry out the functions of the electronic still camera, i.e. auto exposure (AE) control and auto white balance (AWB).

The operation section 36 is provided with keys such as the shutter key and a key for switching between the REC through mode and the PLAY mode. The operation section 36 thus transmits the status signal to the control section 35 in accordance with a key operation. A stroboscope 37 is driven as required when the shutter key is operated (when an image is photographed) to emit auxiliary light. The control section 35 also operates as gain value varying means, gain value detecting means, gain value selecting means, gain value setting means, and recording control means, using a CPU provided therein.

A gain value storing section 38 stores gain values set in the R amplifier 21a and B amplifier 21c of the first gain adjusting circuit 21 when the control section 35 carries out auto white balance control. The gain value storing section 38 also stores gain values set in the R amplifier 22a and B amplifier 22c of the second gain adjusting circuit 22 when the control section 35 carries out auto white balance control. Specifically, the gain value storing section 38 stores a first gain value table 381 as first gain value storing means, shown in FIG. 2A, and a second gain value table 382 as second gain value storing means, shown in FIG. 3A.

Figure 2A:
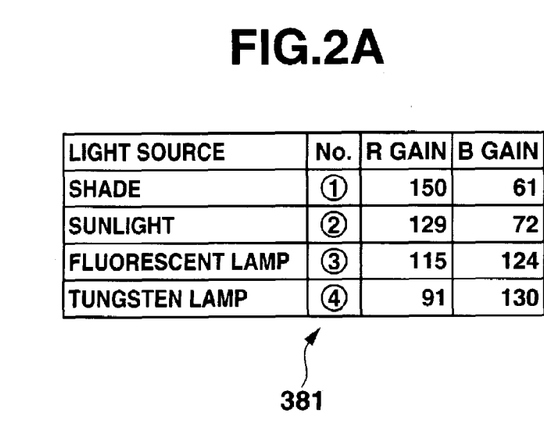
FIGS. 2A and 2B are, inclusively, tables showing gain values stored in a first gain value table together with an explanation thereof.
Figure 2B:
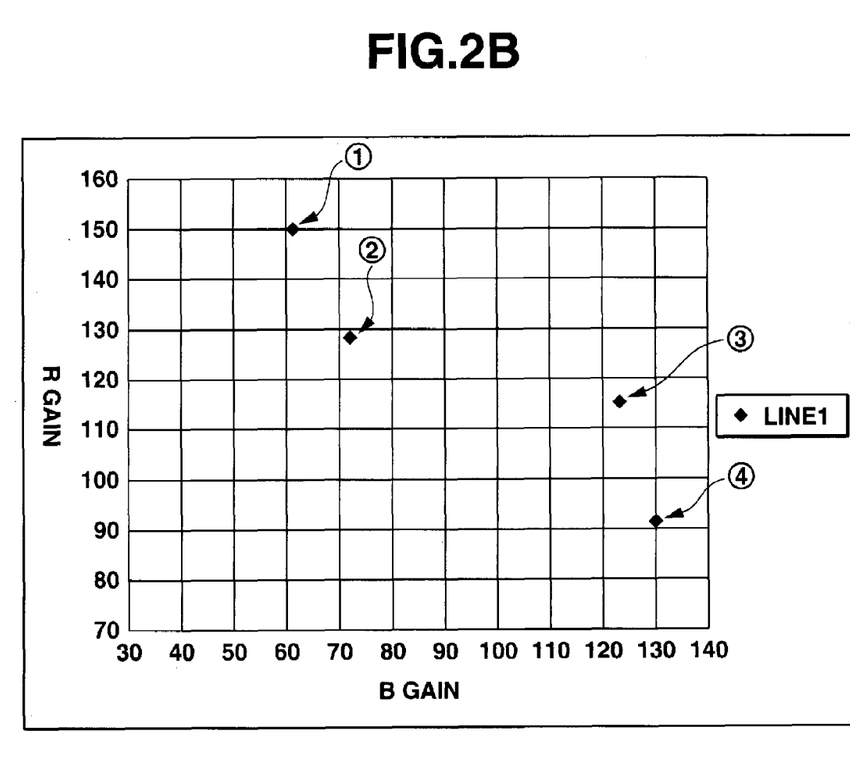

The first gain value table 381 is used when the control section 35 carries out auto white balance control to cause the R amplifier 21a and B amplifier 21c of the first gain adjusting circuit 21 to execute amplification. As shown in FIGS. 2A and 2B, the first gain value table 381 stores R gain values corresponding to gain value Nos. ① to ④ and B gain values corresponding to gain value Nos. ① to ④. Here, the gain value No. ① denotes photographing in the shade, the gain value No. ② denotes sunlight, the gain value No. ③ denotes a fluorescent lamp, and the gain value No. ④ denotes a tungsten lamp. That is, when any of these light sources is used for photographing, the corresponding R and B gain values can be used to set the appropriate white balance. Further, these R and B gain values have been defined experimentally or empirically.

Figure 3A:
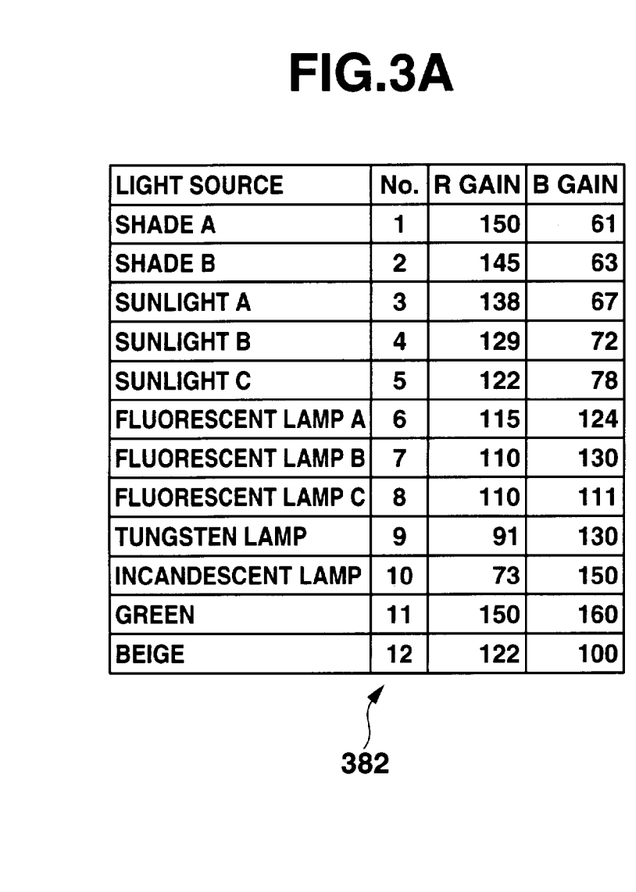
FIGS. 3A and 3B are, inclusively, tables showing gain values stored in the first gain value table together with an explanation thereof.
Figure 3B:
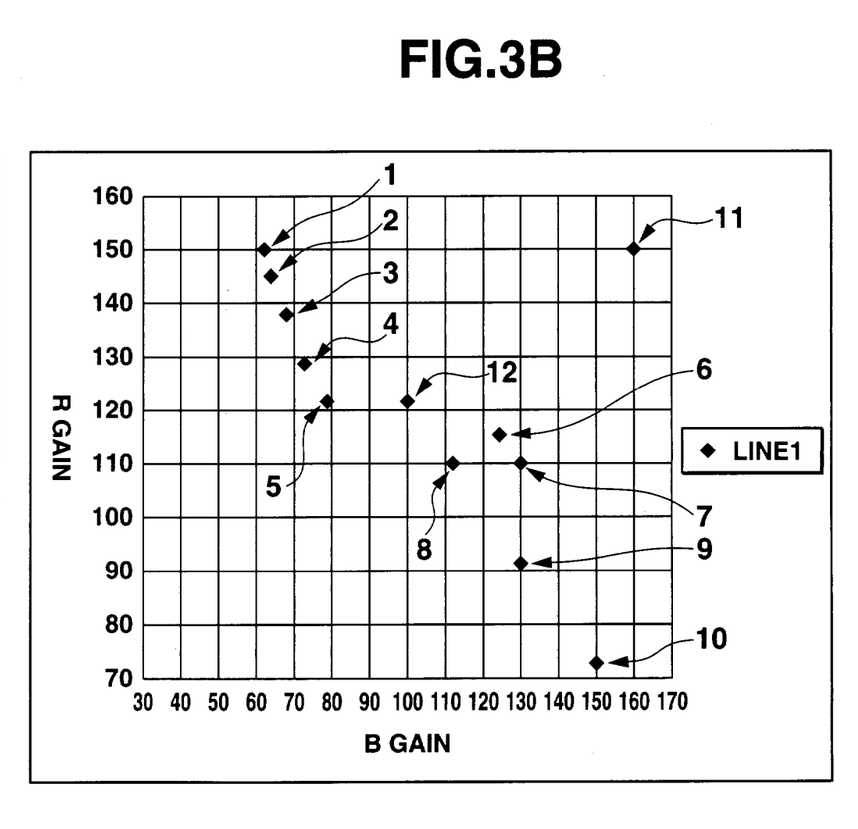

The second gain value table 382 is used when the control section 35 carries out auto white balance control to cause the R amplifier 22a and B amplifier 22c of the second gain adjusting circuit 22 to execute amplification. As shown in FIGS. 3A and 3B, the second gain value table 382 stores R gain values corresponding to gain numbers 1 to 12 and B gain values corresponding to gain numbers 1 to 12. Here, the gain value Nos. 1 and 2 denote photographing in the shade, the gain value Nos. 3, 4, and 5 denote sunlight, the gain value Nos. 6, 7, and 8 denote a fluorescent lamp, the gain value 9 denotes a tungsten lamp, and the gain value 10 denotes an incandescent lamp. That is, when any of these light sources is used for photographing, the corresponding R and B gain values can be used to set the appropriate white balance. Further, the gain value 11 indicates that the subject is green, and the gain value 12 indicates that the subject is beige. That is, in either of these situations, the corresponding R and B gain values can be used to set the appropriate white balance. These R and B gain values have also been defined experimentally or empirically.

In the first gain value table 381 and the second gain value table 382, the pair of the gain value Nos. ① and 1, the pair of the gain value Nos. ② and 4, the pair of the gain value Nos. ③ and 6, and the pair of the gain value Nos. ④ and 9 each correspond to the same R and B gain values.

Figure 4:
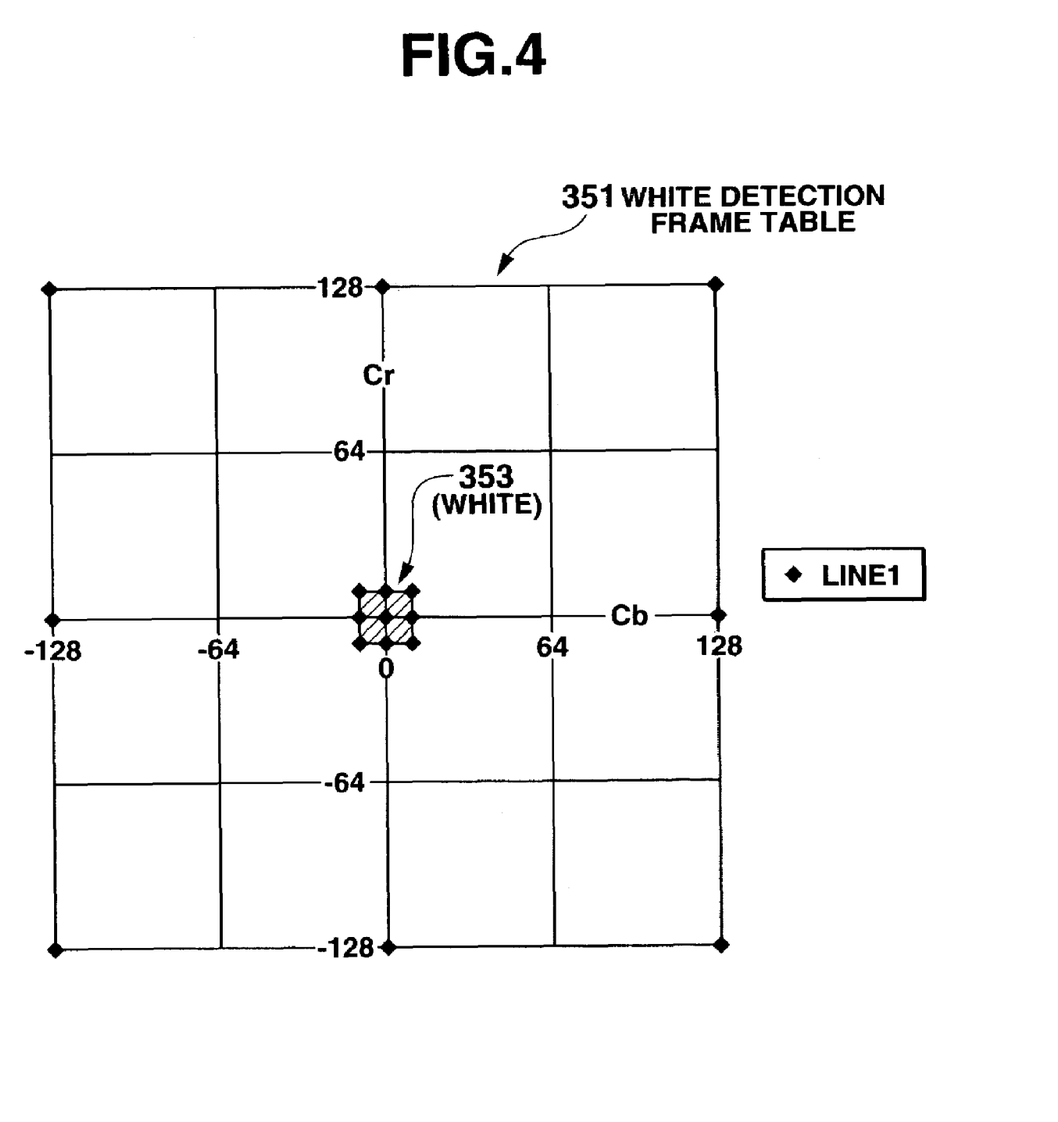
FIG. 4 is a table showing white detection frame data.
Figure 5:
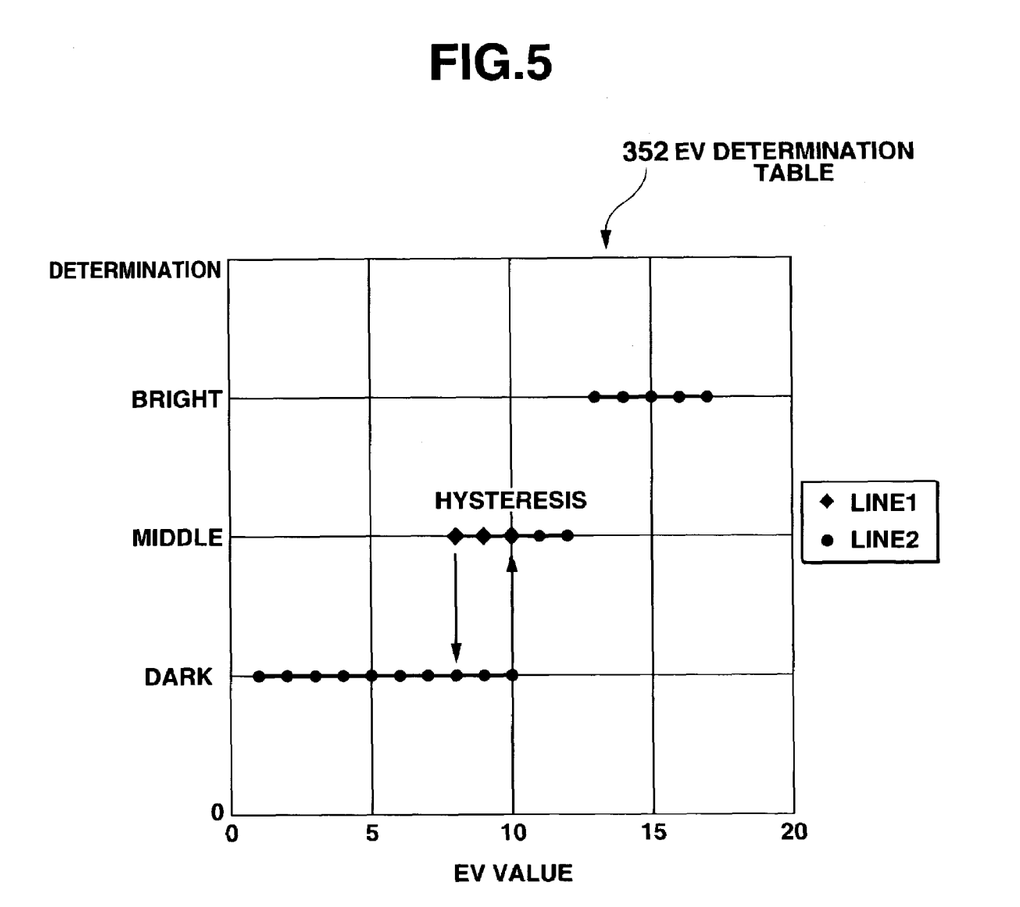
FIG. 5 is a table showing EV value determination data.

Further, the ROM of the control section 35 or the gain value storing section 38 stores white detection frame data 351, shown in FIG. 4, and EV (Exposure Value) determination data 352, shown in FIG. 5.

Figure 6:
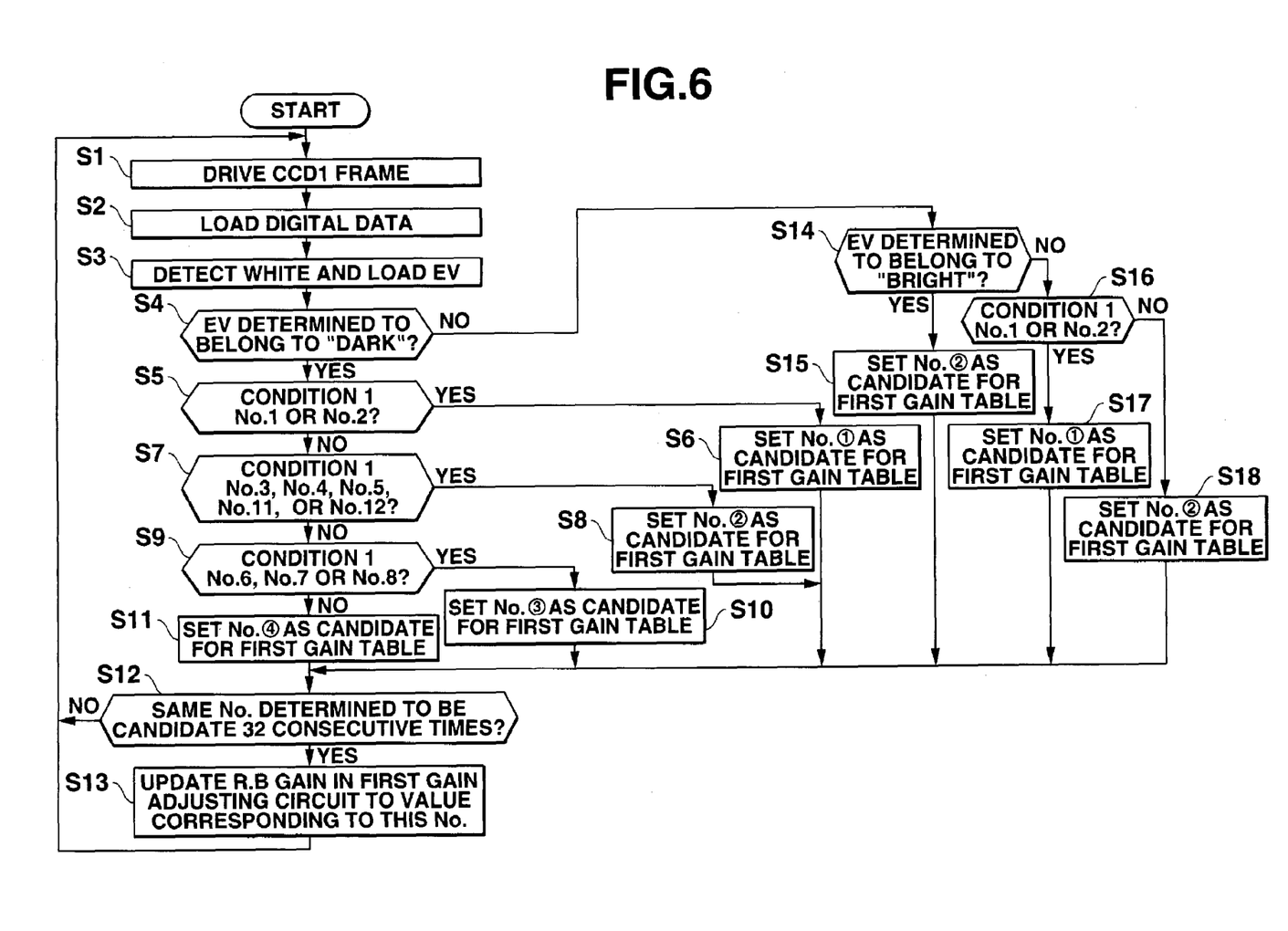
FIG. 6 is a flow chart showing operations in an REC through mode according to the present embodiment.

Now, with reference to the flow chart shown in FIG. 6, description will be given of operations in the REC through mode with an AWB mode set according to the present embodiment configured as described above. The operations in the flow chart shown in FIG. 6 are performed by using the CPU of the control section 35 as gain value varying means, gain value detecting means, gain value selecting means, or gain value setting means in accordance with a predetermined program stored in the ROM.

Specifically, in the electronic still camera, when the REC through mode is set, the control section 35 starts a process in accordance with this flow chart on the basis of the above program. The control section 35 thus drives the CCD 25 by one frame (step S1). Then, the control section 35 loads digital data for the driven frame (step S2). The control section 35 then loads a white detection value and an EV (Exposure Value) (step S3). Then, the control section 35 determines whether or not the EV belongs to the data "dark" (step S4).

The processing in step S4 is executed on the basis of the EV determination data, shown in FIG. 5, to determine whether or not the loaded EV belongs to the data "dark" of the EV determination data 352. If the loaded EV belongs to the data "dark" of the EV determination data 352 (step S4; YES), the loaded image data is estimated to have been photographed in the shade or using the sunlight, a fluorescent lamp, or a tungsten lamp as a light source.

In this case, it is determined whether or not the gain value No. determined under a condition 1 is No. 1 or 2 of the gain value Nos. 1 to 12 from the second gain value table 382 (step S5). Here, the No. determined under the condition 1 refers to the No. corresponding to the largest number of white portions (the number of pixels within a white frame 353 in the second gain value table 382) among the last 12 frames when the gain value Nos. 1 to 12 from the second gain value table are sequentially set in the R amplifier 22a and B amplifier 22c of the second gain adjusting circuit 22 for each frame.

Figure 7:
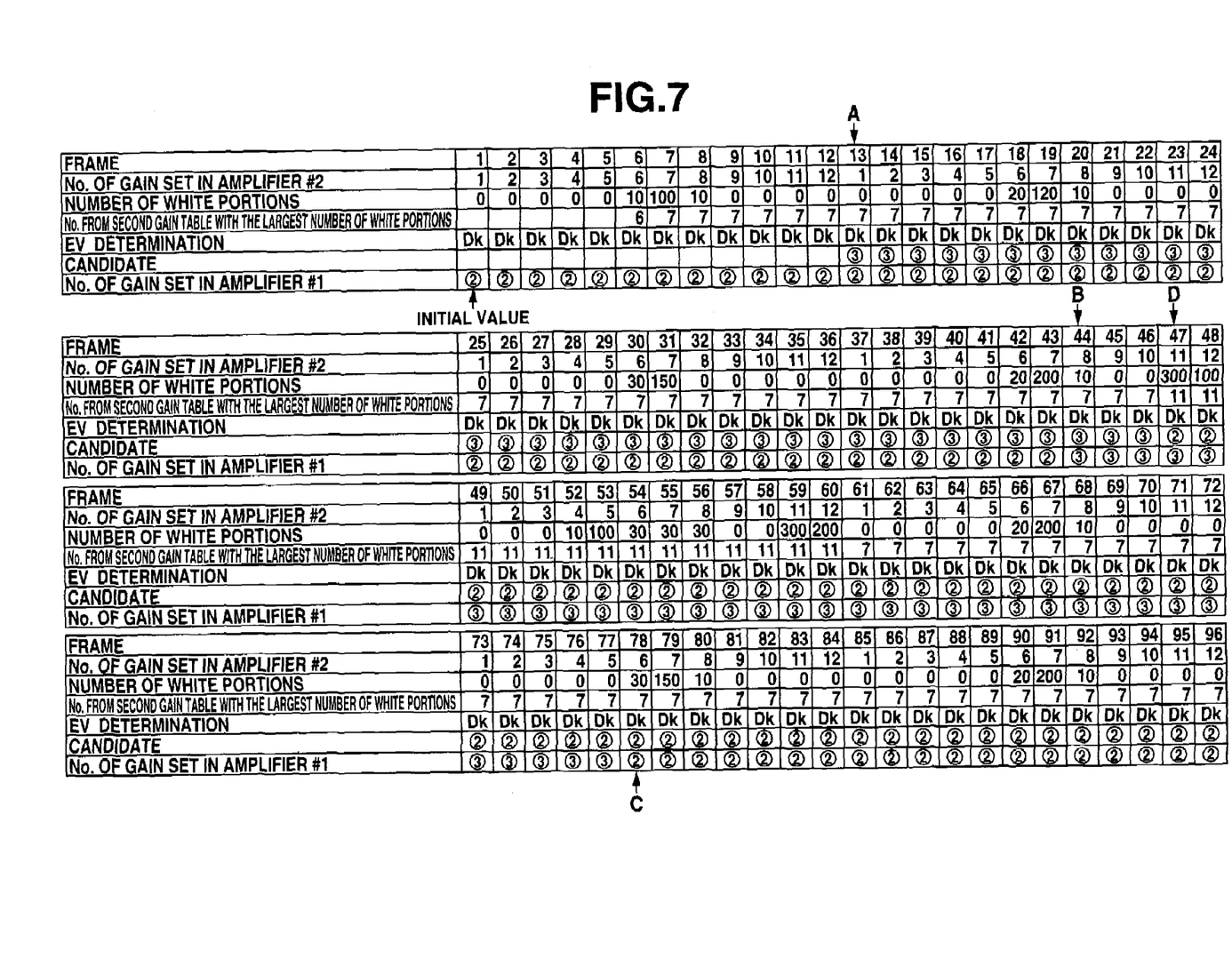
FIG. 7 is a table showing a specific example of operations in the REC through mode according to the present embodiment.

That is, as shown in the specific example in FIG. 7 (in FIG. 7, the first gain adjusting circuit 21 is denoted as "#1" and the second gain adjusting circuit 22 is denoted as "#2"), when the EV is determined to belong to the data "dark", the gain value Nos. 1 to 12 are sequentially set in the R amplifier 22a and B amplifier 22c of the second gain adjusting circuit 22 (#2) for each frame. In FIG. 7, the data "dark" is denoted as "Dk". Thus, the "number of white portions" is detected to determine the No. corresponding to the largest number of white portions among the last 12 frames.

If the result of the determination in step S5 indicates that the gain value from the second gain value table 382 determined under the condition 1 is No. 1 or 2 (step S5; YES), then the No. ① for the shade is determined to be a gain candidate in the first gain value table 381 to be set in the R amplifier 21a and B amplifier 21c of the first gain adjusting circuit 21 (step S6).

On the other hand, if the result of the determination in step S5 indicates that the gain value from the second gain value table 382 determined under the condition 1 is not No. 1 or 2 (step S5; NO), then it is determined whether or not the gain value from the second gain value table 382 determined under the condition 1 is No. 3, 4, 5, 11, or 12 (step S7). If the result of the determination in step S7 is affirmative, the No. ② for the sunlight is determined to be a gain value candidate in the first gain value table 381 to be set in the R amplifier 21a and B amplifier 21c of the first gain adjusting circuit 21 (step S8).

Further, if the result of the determination in step S7 indicates that the gain value from the second gain value table 382 determined under the condition 1 is not No. 3, 4, 5, 11, or 12 (step S7; NO), then it is determined whether or not the gain value from the second gain value table 382 determined under the condition 1 is No. 6, 7, or 8 (step S9). If the result of the determination in step S9 is affirmative, the No. ③ for a fluorescent lamp is determined to be a gain value candidate in the first gain value table 381 to be set in the R amplifier 21a and B amplifier 21c of the first gain adjusting circuit 21 (step S10).

That is, in the specific example shown in FIG. 7, of the gain value Nos. 1, 2, 3, ..., 12 set for frames 1, 2, 3, ..., 12, the No. 7 indicates the largest number of white portions, "100". Therefore, at the point in time of the frame 13 (point in time A), the result of the determination in step S9 is affirmative. Thus, the No. ③ for a fluorescent lamp is determined to be a candidate in the first gain value table 381.

Further, if the result of the determination in step S9 indicates that the gain value from the second gain value table 382 determined under the condition 1 is not No. 6, 7, or 8 (step S9; NO), then the No. ④ for a fluorescent lamp is determined to be a gain value candidate in the first gain value table 381 to be set in the R amplifier 21a and B amplifier 21c of the first gain adjusting circuit 21 (step S11).

On the other hand, if the result of the determination in step S4 indicates that the loaded EV does not belong to the data "dark" of the EV determination data 352 (step S4; NO), it is determined whether or not this value belongs to the data "bright" (step S14). If the EV is determined to belong to the data "bright" (step S14; YES), the loaded image data is estimated to have been photographed using the sunlight as a light source. Thus, in this case, as with step S8, described previously, the No. ② for the sunlight is determined to be a gain value candidate in the first gain value table 381 to be set in the R amplifier 21a and B amplifier 21c of the first gain adjusting circuit 21 (step S15).

However, if the result of the determination in step S14 indicates that the loaded EV does not belong to the data "bright" of the EV determination data 352 (step S14; NO), then as with step S5, described previously, it is determined whether or not the gain value from the second gain value table 382 determined under the condition 1 is No. 1 or 2 (step S16). Then, if the gain value from the second gain value table 382 determined under the condition 1 is No. 1 or 2 (step S16;

YES), then the No. ①for the shade is determined to be a gain value candidate in the first gain value table 381 to be set in the R amplifier 21*a* and B amplifier 21*c* of the first gain adjusting circuit 21 (step S17). However, if the gain value from the second gain value table 382 determined under the condition 1 is not No. 1 or 2 (step S16; NO), then the No. ② for the sunlight is determined to be a gain value candidate in the first gain value table 381 to be set in the R amplifier 21*a* and B amplifier 21*c* of the first gain adjusting circuit 21 (step S18).

Then, it is determined whether or not the same No. has been determined to be a candidate 32 consecutive times in steps S6, S8, S10, S11, S15, S17, and S18 (step S12). If the same No. has not been determined to be a candidate 32 consecutive times (step S12; NO), the processing from step S1 is repeated. When the same No. has been determined to be a candidate 32 consecutive times (step S12; YES), the gain value corresponding to this No. is set in the R amplifier 21*a* and B amplifier 21*c* of the first gain adjusting circuit 21 for update (step S13).

That is, in the specific example shown in FIG. 7, at a point in time B, the number of times No. ③has been determined to be a candidate until then is 32. Accordingly, at the point in time B, the result of the determination in step S12 is affirmative, the initial value No. ② is changed to No. ③. Further, at a point in time C, the number of times No. ② has been determined to be a candidate until then since a point in time D, when the situation seems to have changed, is 32. Accordingly, also at the point in time C, the result of the determination in step S12 is affirmative, the value No. ③ is changed to No. ②.

Therefore, the R amplifier 21*a* and B amplifier 21*c* of the first gain adjusting circuit 21 use the gain value set in step S13, described previously, to amplify the R and B color components of the digital image data in the optical image transmitted by the unit circuit 28. Then, as described previously, the image signal amplified by the first gain adjusting circuit 21 is transmitted to the first color process circuit 23. The first color process circuit 23 executes a color process on the signal and writes the processed signal in the buffer of the DMA controller 29 as YUV data containing a digital luminous signal (Y signal) and color difference signals (Cb signal and Cr signal). The DMA controller 29 then transfers the YUV data written in the buffer to a designated area of the DRAM 30 for expansion. On the basis of the YUV data read from the buffer, the video encoder 31 generates a video signal and outputs it to the display device 32, composed of the LCD in the present embodiment.

Thus, when the REC through mode in the image pickup standby status is set, an image of a subject that maintains a favorable white balance is always displayed on the display device 32 as a through image without the need for a complicated operation of setting white balance in accordance with the light source. Further, instead of an image based on image data from the second gain adjusting circuit 22 for which the gain value Nos. 1 to 12 from the second gain value table 382 are sequentially set for each frame under the condition 1, an image based on image data from the second gain adjusting circuit 22 for which a gain value is updated and set is displayed on the display device 32 as a through image. This avoids a frequent variation in the white balance of the through image displayed on the display device 32.

When the shutter key is depressed to give an instruction on photographing, the recording control means of the control section 35 transmits one frame of YUV data written in the buffer to the compression/expansion section 33. The compression/expansion section 33 compresses the data and then records the compressed data in the flash memory 34. Thus, the image data on the subject image maintaining correct white balance can be recorded in the flush memory 34.

Figure 8:
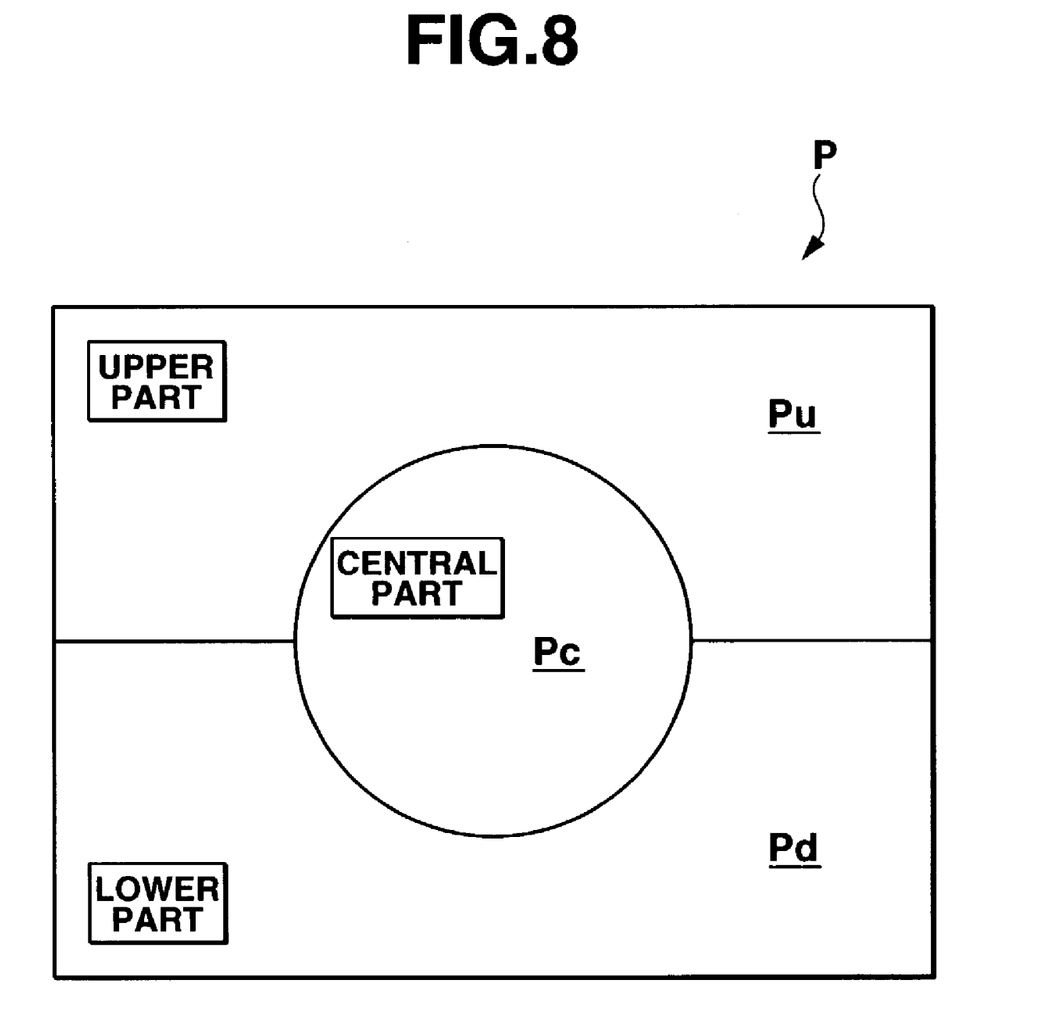
FIG. 8 is a diagram illustrating a white detecting method according to another embodiment of the present invention.

In the present embodiment, the CCD 25 detects white portions in the entire image for one frame. However, if the image P for one frame is divided into three parts, as shown in FIG. 8, including a central part Pc, an upper part Pu, and a lower part Pd, the subject is generally located in the central position Pc. Accordingly, white detection may be performed in a specified area of the image, e.g. in the upper part Pu or lower part Pd but not in the central part Pc.

Further, in the present embodiment, the EV value itself is used for the EV determination. However, an average value of the several EV values may be used for the EV determination. Then, the determination can be accomplished stably without being affected by a change in EV during a short time.

Furthermore, in the present embodiment, the electronic still camera has been mainly described, which records, when the shutter key is depressed with a through image displayed, an image picked up at that time. However, the present invention is not limited to such an electronic still camera. The present invention is applicable to other apparatuses as long as they can execute auto white balance control on picked-up images.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image pickup apparatus comprising:
   an image pickup unit which picks up an image of a subject to output an image pickup signal;
   first and second amplifying units configured to individually amplify color components of the image pickup signal outputted by the image pickup unit;
   a first gain value storing unit configured to store plural types of gain values for respective color components which are used to maintain a white balance of the subject;
   a gain value varying unit configured to sequentially vary types of gain values for the respective color components set in the second amplifying unit;
   a gain value detecting unit configured to detect a type of gain values corresponding to color information contained in a predetermined white detection range on the basis of image information generated using the image pickup signal amplified by the second amplifying unit using the types of gain values for the respective color components sequentially varied by the varying unit;
   a gain value selecting unit configured to select, from the plural types of gain values stored in the first gain value storing unit, a type of gain values to be set in the first amplifying unit, on the basis of the type of gain values detected by the detecting unit;
   a gain value setting unit configured to set the type of gain values selected by the selecting unit, in the first amplifying unit; and
   a recording control unit configured to cause image information generated using the image pickup signal amplified by the first amplifying unit using the type of gain values set by the setting unit to be recorded in an image recording section.

2. An image pickup apparatus according to claim 1, further comprising a second gain value storing unit configured to store plural types of gain values for the respective color components to be set in the second amplifying unit, wherein the varying unit sequentially varies the types of gain values for the respective color components by sequentially setting the plural types of gain values stored in the second gain value storing unit, in the second amplifying unit.

3. An image pickup apparatus according to claim 2, wherein the second gain value storing unit stores more types of gain values than the first gain value storing unit.

4. An image pickup apparatus according to claim 2, wherein the gain value selecting unit selects one of the types of gain values stored in the first storing unit, as a candidate, on the basis of the type of gain values detected by the gain value detecting unit, and if the type of gain values selected as a candidate has been selected as a candidate a predetermined consecutive number of times, the gain value selecting unit selects the type of gain values selected as a candidate as the type of gain values to be set in the first amplifying unit.

5. An image pickup apparatus according to claim 1, wherein the plural types of gain values stored in the first storing unit comprise gain values for the respective color components with which the white balance of the subject is maintained in the shade, under sunlight, under light from a fluorescent lamp, and under light from a tungsten lamp, respectively.

6. An image pickup apparatus according to claim 5, further comprising an exposure determining unit for determining exposure when the image pickup unit picks up an image of the subject, wherein the gain value selecting unit selects the type of gain values to be set in the first amplifying unit, from the first gain value storing unit, on the basis of the exposure determined by the exposure determining unit and the type of gain values detected by the gain value detecting unit.

7. An image pickup apparatus according to claim 1, further comprising a display unit for displaying an image on the basis of image information supplied by the recording control unit.

8. An image pickup apparatus according to claim 1, further comprising a recording unit for recording image information supplied by the recording control unit, in response to a photographing operation.

9. A white balance control method for an image pickup apparatus comprising an image pickup unit for picking up an image of a subject to output an image pickup signal, first and second amplifying units for individually amplifying color components of the image pickup signal outputted by the image pickup unit, and a gain value storage unit for storing plural types of gain values for respective color components which are used to maintain a white balance of the subject, the method comprising:
sequentially varying types of gain values for the respective color components set in the second amplifying unit;
detecting a type of gain values corresponding to color information contained in a predetermined white detection range on the basis of image information generated using the image pickup signal amplified by the second amplifying unit using the sequentially varied types of gain values for the respective color components;
selecting, from the storage unit, a type of gain values to be set in the first amplifying unit, on the basis of the detected type of gain values;
setting the selected type of gain values in the first amplifying unit; and
recording, in an image recording section, the image information generated using the image pickup signal amplified by the first amplifying unit using the set type of gain values.

10. An image pickup apparatus comprising:
an image pickup device which picks up an image of a subject to output an image pickup signal;
first and second amplifying means for individually amplifying color components of the image pickup signal outputted by the image pickup device;
gain value storing means for storing plural types of gain values for respective color components which are used to maintain a white balance of the subject;
gain value varying means for sequentially varying types of gain values for the respective color components set in the second amplifying means;
gain value detecting means for detecting a type of gain values corresponding to color information contained in a predetermined white detection range on the basis of image information generated using the image pickup signal amplified by the second amplifying means using the types of gain values for the respective color components sequentially varied by the varying means;
gain value selecting means for selecting, from the plural types of gain values stored in the storing means, a type of gain values to be set in the first amplifying means, on the basis of the type of gain values detected by the detecting means;
gain value setting means for setting the type of gain values selected by the selecting means, in the first amplifying means; and
display control means for causing an image display section to display image information generated using the image pickup signal amplified by the first amplifying means using the type of gain values set by the setting means.

11. A computer-readable storage medium having a computer program stored thereon that is executable by a computer of an image pickup apparatus comprising an image pickup unit for picking up an image of a subject to output an image pickup signal, first and second amplifying units for individually amplifying color components of the image pickup signal outputted by the image pickup unit, and a storage unit for storing plural types of gain values for respective color components which are used to maintain a white balance of the subject, the program being executable by the computer to cause the computer to perform a process comprising:
sequentially varying types of gain values for the respective color components set in the second amplifying unit;
detecting a type of gain values corresponding to color information contained in a predetermined white detection range on the basis of image information generated using the image pickup signal amplified by the second amplifying unit using the sequentially varied types of gain values for the respective color components;
selecting, from the storage unit, a type of gain values to be set in the first amplifying unit, on the basis of the detected type of gain values;
setting the selected type of gain values in the first amplifying unit; and
at least one of displaying and recording image information generated using the image pickup signal amplified by the first amplifying unit using the set type of gain values.

* * * * *